United States Patent
Osthoff (10) Patent No.: US 11,219,932 B2
(45) Date of Patent: Jan. 11, 2022

(54) METHOD FOR CONTROLLING A ROLLING MILL PRODUCTION SYSTEM

(71) Applicants: Thyssenkrupp AG, Essen (DE); Thyssenkrupp Hohenlimburg GmbH, Hagen (DE)

(72) Inventor: Rainer Osthoff, Dortmund (DE)

(73) Assignees: THYSSENKRUPP AG, Essen (DE); THYSSENKRUPP HOHENLIMBURG GMBH, Hagen (DE)

(*) Notice: Subject to any disclaimer, the term of this patent is extended or adjusted under 35 U.S.C. 154(b) by 284 days.

(21) Appl. No.: 16/299,355

(22) Filed: Mar. 12, 2019

(65) Prior Publication Data

US 2019/0283096 A1 Sep. 19, 2019

(30) Foreign Application Priority Data

Mar. 19, 2018 (DE) .......................... 102018106393.8

(51) Int. Cl.
*G05B 19/418* (2006.01)
*B21B 37/24* (2006.01)
(Continued)

(52) U.S. Cl.
CPC .............. *B21B 37/24* (2013.01); *B21B 37/00* (2013.01); *B21B 37/38* (2013.01); *G05B 19/042* (2013.01);
(Continued)

(58) Field of Classification Search
CPC ......... B21B 37/24; B21B 37/00; B21B 37/38; B21B 2261/18; B21B 2261/12;
(Continued)

(56) References Cited

U.S. PATENT DOCUMENTS 6,240,617 B1 * 6/2001 Nitoh .................. B21B 1/26
29/527.7
6,625,515 B2 * 9/2003 Kerr .................... G01N 29/043
700/148
(Continued)

FOREIGN PATENT DOCUMENTS

DE 4338615 A1 5/1995
DE 102008030243 A1 12/2009
(Continued)

OTHER PUBLICATIONS

Extended European Search Report dated Aug. 9, 2019 for corresponding European Application No. 19156244.6.

*Primary Examiner* — Hien D Khuu
(74) *Attorney, Agent, or Firm* — Harness, Dickey & Pierce, P.L.C.

(57) ABSTRACT

A method of controlling a rolling mill production system for production of a coil-shaped end product from a slab, the production including processing the slab by sequentially arranged production units, the processing by the production units resulting in a respective strip-shaped product having physical data, the method including modeling, under consideration of the physical data, the processing of a testing product by a plurality of production units arranged downstream from a given production unit while taking into account the physical data. If the modelling shows that, under consideration of the physical data, one of the products resulting from processing by the downstream production units does not meet a predetermined quality criterion, the intended manufacture of the product is interrupted and a signal relating to the interrupting is outputted.

16 Claims, 2 Drawing Sheets (51) Int. Cl.
*B21B 37/38* (2006.01)
*B21B 37/00* (2006.01)
*G05B 19/04* (2006.01)
*G05B 19/042* (2006.01)
*B21B 37/74* (2006.01)
*B22D 11/16* (2006.01)
*B24B 5/16* (2006.01)
*B21B 15/00* (2006.01)

(52) U.S. Cl.
CPC ..... *G05B 19/0405* (2013.01); *G05B 19/0421* (2013.01); *G05B 19/4183* (2013.01); *B21B 37/74* (2013.01); *B21B 2015/0021* (2013.01); *B21B 2261/06* (2013.01); *B21B 2261/12* (2013.01); *B21B 2261/18* (2013.01); *B22D 11/16* (2013.01); *B24B 5/167* (2013.01)

(58) Field of Classification Search
CPC ........ B21B 2015/0021; B21B 2261/06; B21B 37/74; G05B 19/042; G05B 19/0421; G05B 19/0405; G05B 19/4183; B22D 11/16; B24B 5/167

USPC ....................................................... 700/150
See application file for complete search history.

(56) References Cited

U.S. PATENT DOCUMENTS

| | | | | |
|---|---|---|---|---|
| 8,459,333 | B2* | 6/2013 | Kurz | B21B 37/00 |
| | | | | 164/451 |
| 8,718,985 | B2* | 5/2014 | Hainke | G05B 17/02 |
| | | | | 703/2 |
| 9,156,070 | B2* | 10/2015 | Kaga | B21B 15/0085 |
| 9,352,367 | B2* | 5/2016 | Kaga | B21B 1/28 |
| 2017/0316131 | A1* | 11/2017 | Tang | G06Q 10/0631 |

FOREIGN PATENT DOCUMENTS

| | | | |
|---|---|---|---|
| EP | 2280324 A1 | | 2/2011 |
| KR | 20080067331 | * | 7/2008 |
| KR | 10-1148944 | * | 5/2012 |
| WO | WO-02/084420 A1 | | 10/2002 |

* cited by examiner

METHOD FOR CONTROLLING A ROLLING MILL PRODUCTION SYSTEM

CROSS-REFERENCE TO RELATED APPLICATIONS

The present application claims priority under 35 U.S.C. § 119 to German Patent Application No. 102018106393.8, filed on Mar. 19, 2018, in the German Patent and Trademark Office, the entire contents of each of which are hereby incorporated by reference.

The invention relates to a method for controlling a rolling mill production system, a computer program product and a control device for controlling a rolling mill production system.

Slabs made of various materials such as steel, copper alloys or aluminum are produced in continuous casting systems and then further processed in a rolling mill. One possibility, for example, is hot rolling, in which the slabs are heated to a corresponding temperature above the recrystallization temperature and then reduced to the specified thickness in a gap of a hot rolling mill by exerting pressure. Since the volume of the slab remains the same, changes in length and width occur. Due to the rolling process, a slab finally becomes a strip which is wound onto a reel to form a coil.

The strip produced in this way can be further processed in further processing steps, for example by applying a pickling process, an annealing process and a coil slitting, i.e. slitting, so that several narrower individual coils can be produced from one wide coil. The result is an end product that can be delivered to a customer after appropriate packaging.

The invention has as its object to provide for an improved method for controlling a rolling mill production system for production of a coil-shaped end product, a corresponding computer program product and a control device for controlling such a production system. The object is achieved by the features of the independent patent claims. Preferred embodiments of the invention are given in the dependent claims.

A method for controlling a rolling mill production system for production of a coil-shaped end product from a slab, wherein the production comprises processing of the slab by sequentially arranged production units, wherein a strip-shaped product results in each subsequent stage from the processing by the respective production unit, wherein the end product is a result of the product processing by the last of the production units, wherein the method comprises receiving physical data of a strip-shaped to-be-tested product of the products, which results from processing by a given production unit of the production units, the physical data comprising a geometry and/or a weight, the method comprising a testing procedure, the testing procedure comprising:
  modelling, under consideration of the physical data, the processing of the to-be-tested product by a plurality of the production units subsequent to the given production unit,
  in case the modelling shows that, under consideration of the physical data, one of the products resulting from the processing by the subsequent production units does not correspond to a predetermined quality criterion, interrupting the intended production of the product and outputting a signal related to the interrupting.

Embodiments of the invention could have the advantage that, due to the modelling of several production units that are arranged subsequent to the given production unit, unnecessary processing steps can be avoided, which could arise, for example, if the to-be-tested product in the current processing step is no longer suitable for further processing at any later stage in the production chain. Thus, not only it is checked whether the product meets the corresponding specifications or quality criteria with regard to the immediately upcoming processing step, but there is also a "future-oriented view" which extends over several subsequent production units and even preferably includes the complete subsequent production chain. This means that it can no longer happen that the coil at the end of the production chain no longer matches the corresponding customer specifications with regard to weight and dimensions of the end product and can therefore no longer be marketed as "1A goods". In this respect, the process could serve to minimize any scrap in the production of the end products and thus increase the efficiency of the rolling mill production.

The term "production unit" refers to any unit which, as a result of the processing of a product, results in a physically or chemically altered form of the product. The examples of production units are aggregates Milling, Cooling, Pickling, Slitting, Annealing and Packing.

A "product" can be an intermediate product resulting from processing or the end product itself. Processing by the last production (or processing) unit results in the end product. Processing by any other production (or processing) unit before the last production (or processing) unit results in an intermediate product.

"Annealing" refers to a heat treatment of the product with which the material properties of the product can be changed. "Pickling" is used to achieve a bright surface as a result of the exposure to acids. "Slitting" means the longitudinal cutting of the product into strips of smaller width, for example on machines with circular knife shears, which knives are fixed at an appropriate distance on corresponding knife bars.

"Modelling" encompasses any type of prediction of the change in the physical properties of a product when it has been processed by several of the production units downstream of the given production units. Physical data of the strip-shaped product to be tested are the input parameters. The modeling itself can, for example, be done using mathematical models in analytical, heuristic, directly numerical or approximately numerical form. However, it is also possible to use neural networks, which could have the particular advantage that the real processing behavior of the processing units can be taken into account and thus special "peculiarities" of the respective production unit are automatically taken into account.

Said signal, which is outputted with regard to the interruption, could, for example, be an acoustic, optical or electronic signal. For example, the signal could be displayed on a monitoring screen so that a production line operator is able to take appropriate action after visually detecting the signal. In the event that this signal is a purely electronic signal, it could be used as a "trigger" by the production line to transfer the to-be-tested product unsuitable for further processing for another use.

According to an embodiment of the invention, the modelling of the processing comprises a prediction of the physical data of the product immediately resulting from the respective processing, wherein with respect to the product immediately resulting from the respective processing, the quality criterion comprises an admissible tolerance range with respect to a geometry and/or a weight, wherein the modelling of the respective processing takes into account, insofar available, the prediction of the physical data of the product immediately resulting from this respective processing.

For example, the modelling of the processing of the product to be tested provides a further product, which as such only exists in hypothetical form due to the modelling. The modelling takes now this hypothetically available product and/or its hypothetical physical data as input, in order to accomplish a modelling regarding the next processing step for this hypothetical product, which is now directly lining up likewise. Also by this further modelling again a hypothetically existing product with appropriate computed or determined physical data is created, which can be submitted then to the test concerning the conformity with the quality criterion. Basically, the described procedure can make it possible to check and forecast the conformity of the end product resulting from the respective product to be checked with regard to order specifications (geometry, weights) at any time during production. For example, a customer specifies exact specifications regarding the width, thickness, outer diameter and weights of the desired end products as well as their tolerances. All this can be used as a "quality criterion" and a check can be made as to whether, based on the product currently to be tested, a hypothetically resulting end product satisfies these customer specifications or not.

For example, the tolerance range indicates the range in respect of which immediate subsequent processing of products by the production unit assigned to immediate subsequent processing is permissible. In other words, it could be tested here whether a product that is practically or hypothetically ready for processing can be processed at all by the assigned production unit. This is not so much about the end product as it is about the plant's ability to handle the products that are fed in. For example, a strip slitting system could have the specification that the minimum width of a remaining slit strip must not be less than 30 mm, otherwise correct handling of the strips of cold or hot wide strip is no longer guaranteed without a risk of damage to the system. It would also be possible that the system could carry out the slitting process, but then a specified slitting quality could no longer be guaranteed with regard to the slitting result. There can also be an upper limit for the width of the processable coils above which the corresponding production unit is no longer able to carry out the corresponding processing without any risk of damage.

The tolerance ranges for which immediate subsequent processing of products is permissible can therefore also be used for quality assurance of the product produced by the corresponding production unit. If, for example, the product produced in the "hot rolling" production unit is too wide, a uniform cooling process across the entire width of the produced strip could no longer be guaranteed in the subsequent "cooling unit". Also here the tolerance range serves to ensure that a directly following processing of products is at all able to carry out the processing without quality losses concerning the in such a way produced product or a damage of the system.

According to an embodiment of the invention, the tolerance range determines: a minimum and a maximum permissible width, and/or a minimum and a maximum permissible weight, and/or a minimum and a maximum coil outside diameter of the product.

For example, the tolerance range specifies a maximum deviation of the actual geometry resulting from processing from a target geometry of the end product and/or a maximum deviation of the actual weight resulting from processing from a target weight of the end product. The deviation with regard to the desired geometry or with regard to the desired weight can have thereby various reasons. For example, a deviation of the actual geometry from the target geometry and/or a deviation of the actual weight from the target weight can result from a pickling of the product by one of the production units, an annealing of the product by one of the production units, a shortening of the length of the strip-shaped product by one of the production units, or a slitting of the coil-shaped product by one of the production units.

Pickling removes material from the product, thereby changing its weight and geometry. The annealing of the product causes a change in the material, which can also result in a change in weight. A reduction in the length of the strip-shaped product may be necessary if, due to hot rolling, the final rolling temperature is still so high after cooling on the cooling section that when the strip is reeled on the relatively very cold reel core, extreme cooling of the strip takes place when the first meters of strip are wound. While the rest of the strip is cooled in a uniform and homogeneous manner with respect to the remaining strip length, the first few meters of the strip are cooled in a "different" way. This inevitably leads to other physical properties of this correspondingly differently cooled area of the strip, such as other elastic properties of this part of the strip. However, since the physical properties of the end product must be homogeneous over the entire length of the strip, this different cooled part of the strip is typically shortened by cutting out this different cooled part of the strip. This means, however, that the product "coil" lacks several meters of strip material, whereby the modelling is used to check the further processing of the shortened product up to the obtaining of the resulting end product. Only if, despite the reduction in length, the corresponding customer specifications regarding the end product can be met, i.e. in this example of length change the actual length of the end product to be expected is within the maximum deviation from the target length, the intended further processing of the shortened coil can be carried out in the intended manner by the subsequent production units.

According to an embodiment of the invention, the testing procedure further comprising a preliminary test of the physical data of the to-be-tested product, wherein the geometry described by the physical data corresponds to an actual geometry and/or the weight described by the physical data corresponds to an actual weight, wherein the to-be-tested product results from the previous processing by one of the production units, wherein a target geometry and/or a target weight is assigned to the to-be-tested product on the basis of this previous processing, wherein in case the actual geometry deviates from the target geometry and/or the actual weight deviates from the target weight by a predetermined value, the signal is outputted.

This could have the advantage that a kind of plausibility check could be carried out to determine whether a previous processing step was carried out correctly or not. If, for example, in the above example of length shortening, a processing step "shortening the strip" was considered necessary, said plausibility check can determine whether this processing step was carried out at all or not. In the case of a length shortening, the processing step would result in a shorter length of the strip, which would result in a correspondingly precisely calculable change in the weight of the coil or in the length of the strip of the coil. If, for whatever reason, a deviation between target and actual geometry or target and actual weight has been determined, the output of the signal can be used to manually check, for example, whether the previous processing did not lead to the desired result.

For example, the preliminary test is performed before the performing of the modelling, which altogether could save the computer processing resources of the system. Since the modelling may involve a considerable amount of computational effort, the execution of unnecessary calculations could be prevented if the preliminary test is carried out first, since further modelling makes no sense at all if the preliminary test fails.

According to an embodiment of the invention, the method further comprises determining the target geometry and/or the target weight of the to-be-tested product, wherein the determining of the target geometry and/or the target weight comprises modelling the processing of the slab or one or more of the products by a plurality of production units preceding the given production unit to obtain the to-be-tested product. It is therefore a backward-looking approach, taking into account what should have resulted from, for example, a slab, if the processing steps had been properly carried out by the previous production units for a product. This product then has the physical properties of a target geometry or target weight, which in turn can be used for the above-mentioned plausibility check.

According to an embodiment of the invention, the modelling takes into account a reduction of the target geometry and/or the target weight due to a length reduction and/or a width reduction of one of the products by one of the production units preceding the given production unit.

It should be noted at this stage that there may be different reasons for the reduction in length and width. In addition to the problems described above regarding the first part of the coil to be strongly cooled, segments of the coil can also be of such a nature that at least these segments cannot meet the customer's specifications for the end product. For example, different segments of a coil may have scale inclusions or edge cracks, which can be detected as usual using video comparison techniques and can be used as the physical data for modeling. In this case, the modeling of the processing could check whether at least a part of the product to be tested can be saved at a certain moment by smart splitting of the product to be tested and thus be used as the coil-shaped end product. If, for example, the product to be tested is a coil with a width of 650 mm and the customer has defined a coil with a width of 200 mm as the specification for the end product, then in this case an edge crack of the product to be tested that extends over a longer area could be taken into account in such a way that at the latest when the coil is split, the part of the coil that has the edge crack is split/cut off, since this means that the desired customer specification of 200 mm coil width can be adhered to without any problems with regard to the remaining part of the coil.

According to an embodiment of the invention, the method further comprises in response to the outputting of the signal, receiving a product specific positive list identifier related to the quality criterion for which the modelling revealed that one of the products resulting from the processing by the subsequent production units does not meet the predetermined quality criterion, wherein on the basis of receiving the product specific positive list identifier for this product and all products resulting from the processing of this product, the quality criterion is adjusted according to the corresponding positive list identifier. A kind of "inheritance" takes place in which non-compliance with the quality criterion is accepted on the basis of the product to be tested and also with regard to the subsequent production units.

The positive list identifier could therefore also include instructions for the subsequent production units to control the way in which the product to be tested and the resulting products are processed. For example, the hem width of the product to be tested could be only 10 mm, whereas the minimum nominal hem width of the ring must be 12 mm. In this case, a positive list identifier could be defined as a release of this coil with a hem of 10 mm, together with the instruction to the subsequent production units that a processing speed specifically for further processing of this product and all resulting further products must be reduced by a certain value.

The advantage here could be that, despite the non-compliance with the quality criterion, it could still be ensured in an exceptional way that a coil does not have to be regarded as scrap and thus the production efficiency of the system is increased, and that a possibility of further processing and further use can also be found for this special case.

According to an embodiment of the invention, the method further comprises receiving a slab-specific positive list identifier related to the quality criterion, wherein on the basis of the receiving of the slab-specific positive list identifier, the quality criterion is adjusted in accordance with the corresponding positive list identifier. For example, the positive list identifier generally increases the tolerance range for all products resulting from processing of this slab.

The slab-specific positive list identifier could have the advantage that even if a slab that does not meet the desired quality criteria is obtained, it could still be possible to process it through the forthcoming processing steps, if necessary by adjusting the processing steps or with regard to processing speed, temperatures, pressures, etc. The positive list identifier can also be used to identify the slab that does not meet the desired quality criteria. The same applies here as discussed above with regard to the product-specific positive list identifier.

According to an embodiment of the invention, the physical data relates to a plurality of different areas of the strip-shaped to-be-tested product according to a predefined pattern, wherein the outputted signal indicates the defect area of the strip-shaped product having physical data for which the modeling results that a product resulting from processing by the subsequent production units does not satisfy the predetermined quality criterion. This could have the advantage that due to the "digitization" of the product "coil" an exact physical description of this product is possible. This makes it possible to carry out the modelling much more precisely and in accordance with the real conditions, so that it can actually be predicted with much greater precision to what extent the digitalized coil of the product to be tested will ultimately result in the other intermediate products and the end product therefrom.

According to an embodiment of the invention, the method further comprises checking whether a defect-free portion of the final product corresponds to another desired final product on the basis of adapted processing of the to-be-tested product by the production units, the checking comprising:

modelling, under consideration of the physical data, the adapted processing of a portion of the to-be-tested product without the defect area by a plurality of the production units subsequent to the given production unit, in case the modelling shows that, under consideration of the physical data, one of the products resulting from the adapted processing by the subsequent production units does not meet a predetermined quality criterion, the intended manufacture of the final product is cancelled and the signal is outputted.

This could have the advantage that the modelling itself searches for possibilities how at least parts of the product to be tested can be put to an appropriate use despite the presence of the defect. Due to the digitalized coil, the complete production chain can thus be tested proactively, taking into account the extent to which the production of an end product is optimally possible, taking into account the capabilities of the system and the product to be tested.

In another aspect the invention relates to a computer program product having processor executable instructions for performing the method described above.

In a further aspect the invention relates to a control device of a rolling mill production system for production of a coil-shaped end product from a slab, the production comprising processing of the slab by sequentially arranged production units, a strip-shaped product resulting in each subsequent stage from the processing by the (respective) production unit, the end product being a result of the product processing by the last of the production units, wherein the control device is configured to receive physical data of a strip-shaped to-be-tested product of the products, which results from processing by a given production unit of the production units, the physical data comprising a geometry and/or a weight, wherein the control device comprises a processor and a memory comprising processor executable instructions, wherein execution of the instructions by the processor causes the control device to execute a testing procedure, the testing procedure comprising:

modelling, under consideration of the physical data, the processing of the to-be-tested product by a plurality of production units subsequent to the given production unit, in case the modelling shows that, under consideration of the physical data, one of the products resulting from the processing by the subsequent production units does not correspond to a predetermined quality criterion, interrupting the intended production of the product and outputting a signal related to the interrupting.

It should be noted that the above embodiments may be combined in any way, provided that their combination is not mutually exclusive.

The skilled person will understand that aspects of the present invention may be executed as a device, process or computer program product. Accordingly, aspects of the present invention may take the form of a pure hardware design, a pure software design (including firmware, memory software, micro-code, etc.), or a design combining software and hardware aspects, all of which may be commonly referred to herein as a "circuit", "module" or "system". Furthermore, aspects of the present invention may take the form of a computer program product embodied in a computer-readable medium or in multiple computer-readable media in the form of computer-executable code.

Any combination of one or more computer-readable media(s) may be used. The computer-readable medium may be a computer-readable signal medium or a computer-readable storage medium. A "computer-readable storage medium" as used herein encompasses a physical storage medium capable of storing instructions executable by a processor of a computer device. The computer-readable storage medium may be referred to as a computer-readable non-volatile storage medium. The computer-readable storage medium may also be described as a tangible computer-readable medium. In some embodiments, a computer-readable storage medium may also be capable of storing data that enables it to be accessed by the processor of the computer device. Examples of computer-readable storage media include, but are not limited to: a floppy disk, a magnetic hard disk, a solid-state hard disk, flash memory, a USB flash drive, random access memory (RAM), read-only memory (ROM), an optical disk, a magneto-optical disk, and the register file of the processor. Examples of optical disks include Compact Disks (CD) and Digital Versatile Disks (DVD), such as CD-ROM, CD-RW, CD-R, DVD-ROM, DVD-RW, or DVD-R disks. The term computer-readable storage medium also refers to various types of recording media that are capable of being accessed by the computer device via a network or communication link. For example, data can be retrieved via a modem, the Internet, or a local network. Computer executable code stored on a computer-readable medium may be transmitted over any suitable medium, including, but not limited to, wireless, wired, optical, RF, etc., or any suitable combination of the aforesaid media.

A computer-readable signal medium may contain a propagated data signal containing the computer-readable program code, for example, in a base signal (baseband) or as part of a carrier signal (carrier wave). Such a propagation signal may be in any form, including, but not limited to, an electromagnetic form, an optical form or any suitable combination thereof. A computer-readable signal medium may be any computer-readable medium which is not a computer-readable storage medium and which is capable of transmitting, distributing or transporting a program for use by or in connection with a system, apparatus or device for executing instructions.

"Computer memory" or "memory" is an example of a computer-readable storage medium. A computer memory is any memory that is directly accessible to a processor.

"Computer data memory" or "data memory" is another example of a computer-readable storage medium. Computer data memory is any non-volatile computer-readable storage medium. In some forms, a computer memory may also be a computer data memory, or vice versa.

"Processor" as used herein encompasses an electronic component capable of executing a program- or machine-executable instruction or computer-executable code. A reference to the computer device that includes a "processor" should be interpreted to mean that it may include more than one processor or processing cores. For example, the processor may be a multi-core processor. The term computer device or computer can also be interpreted as referring to a cluster or network of computer devices or computers each comprising a processor or processors. The computer executable code may be executed by multiple processors that may be distributed within the same computer device or even across multiple computers.

Computer executable code may include machine executable instructions or a program that causes a processor to perform an aspect of the present invention. Computer-executable code for performing operations for aspects of the present invention may be written in any combination of one or more programming languages, including an object-oriented programming language such as Java, Smalltalk, C++ or similar, and traditional procedural programming languages such as the programming language "C" or similar, and translated into machine-executable instructions. In some cases, the computer-executable code may be in the form of a high-level programming language or in a pre-translated form, and may be used in conjunction with an interpreter that generates the machine-executable statements.

The computer-executable code may be executed entirely on a user's computer, partly on the user's computer, as a stand-alone software package, partly on the user's computer and partly on a remote computer, or entirely on the remote computer or server. In the latter case, the remote computer may be connected to the User's computer through any type of network, including a local area network (LAN) or wide area network (WAN), or the connection may be established with an external computer (for example, over the Internet using an Internet service provider).

Aspects of the present invention are described by reference to flowcharts and/or block diagrams of procedures, devices (systems) and computer program products according to the embodiments of the invention. It should be noted that any block or part of the blocks of flowcharts, representations and/or block diagrams may be executed by computer program instructions, possibly in the form of a computer executable code. It is further noted that combinations of blocks in different flowcharts, representations and/or block diagrams may be combined if they are not mutually exclusive. These computer program instructions may be provided to a processor of a general purpose computer, special computer or other programmable data processing apparatus to produce a device such that the instructions executed by the processor of the computer or other programmable data processing apparatus produce means for executing the functions/steps defined in the block or blocks of flowcharts and/or block diagrams.

These computer program instructions may also be stored on a computer-readable medium which can control a computer or other programmable data processing devices or other devices to operate in a particular manner so that the instructions stored on the computer-readable medium produce a manufacturing product, including instructions which implement the function/step defined in the block or blocks of flowcharts and/or block diagrams.

The computer program instructions may also be stored on a computer, other programmable data processing devices, or other devices to cause execution of a series of process steps on the computer, other programmable data processing devices, or other devices to cause a process executed on a computer, so that the instructions executed on the computer or other programmable devices provide methods for implementing the functions/steps specified in the block or blocks of flowcharts and/or block diagrams.

In the following, the preferred embodiments of the invention are explained in more detail using the drawings, wherein.

In the following, similar elements are marked with the same reference numbers.

Figure 1:
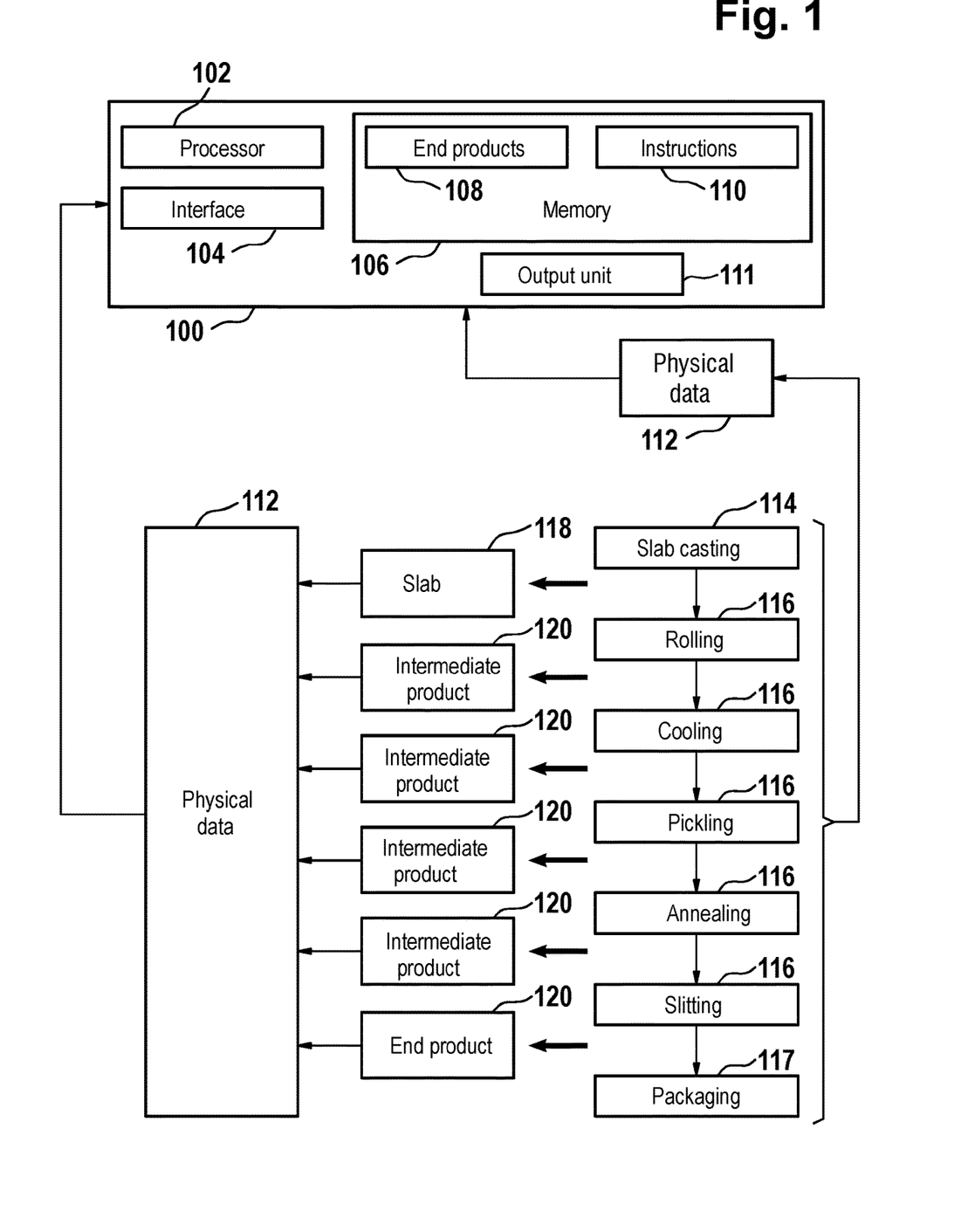
FIG. 1 shows a block diagram of a rolling mill production system.

FIG. 1 shows a block diagram of a rolling mill production system with different production units 116, also known as aggregates. A continuous casting system, for example, which carries out slab casting is not part of the production system. Nevertheless, for the sake of completeness, the continuous casting system is shown in the block diagram of FIG. 1 marked with reference symbol 114, since the physical data of the slab produced by the continuous casting system can be used further.

The produced slab 118 can, for example, be rolled into a strip in a hot rolling process using a corresponding aggregate 116, whereby a hot rolled strip results here as an intermediate product 120. This is followed by the production unit 116 "Cooling", wherein the strip results after cooling in a cooled strip which, after reeling on a reel, becomes an intermediate product 120 "Coil". This intermediate product can also be further processed, for example by being pickled by the production unit 116 "Pickling", where the intermediate product 120 results in a pickled coil.

Downstream of this is the production unit "annealing" 116, from which a cooled coil results as an intermediate product 120. The last step is the slitting by the production unit "Slitting" 116, which finally results in the end product 120. This can then be packaged in a "packaging" processing step by a corresponding packaging unit 117 and then made available to the end customer.

Both the slab 118 and each of the intermediate products or end product (commonly referred to as "product") is characterized by corresponding physical data. The geometric shape and weight of the slab are known. With regard to the intermediate products, a digital form of the strip or coil is available, which, for example, indicates the width and thickness of the strip, the total weight of the coil as well as other defects of the strip by means of meter-precise screening. The physical data 112 can either, as sketched on the left side of FIG. 1, be obtained by a special and separate measurement of the slab or the respective intermediate product, or the physical data 112 can, as sketched on the right side of FIG. 1, already be recorded and obtained during processing by the respective production unit 116. For this purpose, the production units can have corresponding sensors which directly measure and digitize a strip resulting from the respective production unit 116. For example, cameras and sensors could be positioned at the end of the hot rolling section of the "rolling" unit in order to directly measure the strip rolled into its final shape, i.e. to obtain the physical data 112 from it.

The physical data 112 are then transferred to a control module (or control device) 100. The control module 100 initially has a corresponding interface 104 to receive this physical data 112. Furthermore, the control module 100 has a processor 102 and a memory 106, whereby the memory contains instructions 110, which when executed by the processor 102 cause a control of the production system. In particular, the instructions 110 effect a modelling of the processing of one of the intermediate products by a plurality of the production units downstream of said production units while taking into account the physical data generated using the intermediate product 120 to be tested, and a check as to whether the modelling results in one of the products resulting from the processing by the production units downstream not satisfying a predetermined quality criterion while taking into account the physical data.

If the latter is the case, instructions 110 interrupt the intended manufacture of the product and output a corresponding abort signal via an output unit 111, which may be, for example, a graphical user interface, an acoustic signaling device or another interface through which a corresponding electronic signal can be transmitted to a corresponding receiver.

In addition, 106 specifications related to the end products to be manufactured are stored in the memory 108, whereby these specifications include, for example, a target geometry and a target weight of the desired end products.

Figure 2:
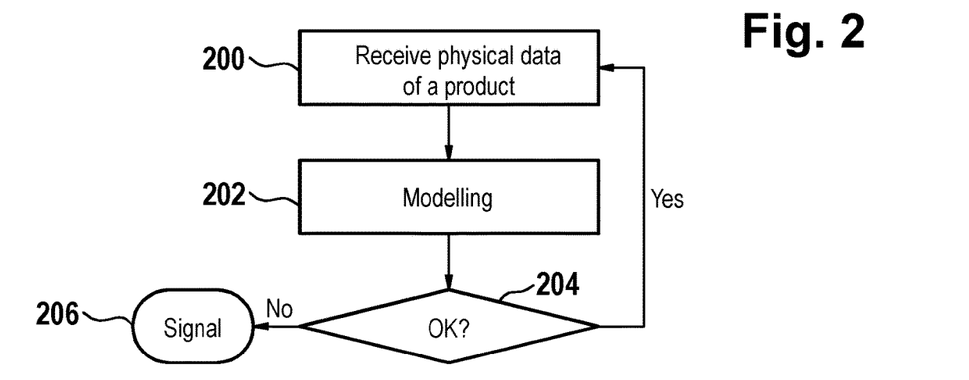
FIG. 2 shows a flow chart of a method for controlling a rolling mill production system.

The flowchart in FIG. 2 explains the basic principle of how the control module 100 works. In step 200, the physical data 112 is first obtained using one of the intermediate products 120.

In step 202, the processing of this strip by several production units downstream from the given production unit "rolling" is modelled, i.e. by the production units "cooling", "pickling", "annealing", "slitting" while taking into account the physical data.

For example, it is modelled how the intermediate product 120 resulting from the rolling process changes due to cooling. This in turn is another hypothetical intermediate product, which is then investigated on the basis of the modelling to see how it changes further within the framework of a pickling process. This continues up to the modelling of the obtaining of the resulting end product 120, whereby now for example in step 204 it is checked whether the resulting product complies with a predetermined quality criterion or not. If this is not the case, a signal is output in step 206 and the procedure is aborted. If, on the other hand, the end product meets the predetermined quality criterion, the process continues and the strip is released for further processing by the downstream production units.

Figure 3:
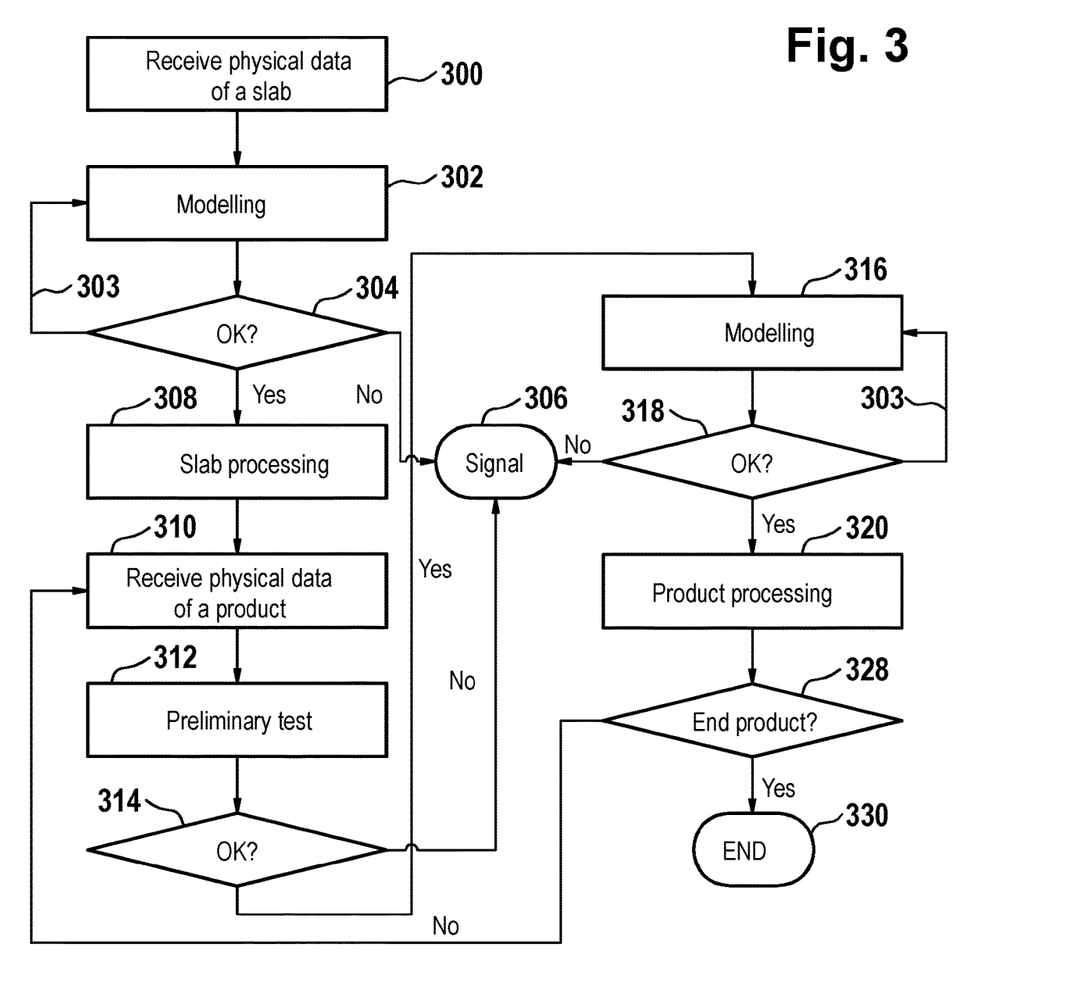
FIG. 3 shows a flow chart of a method for controlling a rolling mill production system.

FIG. 3 shows a more detailed view of a process for controlling a rolling mill production system. The procedure begins at step 300 with the receiving of the physical data of a slab to be processed 118. The slab is modelled with regard to its processing in the designated production units 116 in step 302. The physical data are entered as parameters. Depending on the configuration of the method, the following step 304 of the check as to whether, taking into account the physical data, one of the products resulting from the processing by the now relevant manufacturing units corresponds to a predetermined quality criterion or not, can be carried out for each of the intended processing steps of the manufacturing unit 116 or only for part of the manufacturing units. This is symbolized by arrow 303.

For example, the rolling process is first modelled in step 302 using the physical data of the slab. It is then checked whether the corresponding rolling result meets a predetermined quality criterion or not. If this corresponds to the quality criterion, the physical data of the rolling result modelled in this way are again processed in step 302, this time to model the cooling process. If step 304 again indicates that the physical data of the intermediate product resulting from the cooling process correspond to a predetermined quality criterion, this intermediate product resulting from the cooling process can in turn be supplied to a further modelling in step 302 with respect to a subsequent pickling process. This procedure may be repeated cyclically until, finally, in step 304, with respect to the resulting (hypothetical) end product, it has been determined whether or not the physical data of this hypothetical end product meet the predetermined quality criterion. Depending on how many cyclic modelling and testing steps 302 and 304 have been carried out, only after successful testing of all these modelling and testing steps does the process continue at step 308, namely the actual processing of the slab by the hot rolling process.

If, at any time, step 304 indicates that the quality criteria relating to the physical data of one of the intermediate products are not met, the method goes to step 306, i.e. aborting the scheduled manufacture of the product (in this case aborting the feeding of the slab into hot rolling) and outputting a corresponding signal relating to the abort.

After the slab has been rolled into a strip by hot rolling in step 308, physical data of this product "strip" is received in step 310, for example in the form of a grid-shaped digitalization of the physical data of this strip.

Now, in steps 312 and 314, an optional preliminary check is performed, i.e. a kind of plausibility check, to determine whether the previous processing steps that led to the physical data of the product correspond to the specifications made with regard to the processing of the product. In the above example, it is first assumed that in the present case such specifications were not provided, so that steps 312 and 314 would only be discussed later. In this respect, the process continues immediately with step 316 and a modelling of the processing of the product "hot-rolled strip" by subsequent production units, analogous to the way it has already been discussed with regard to steps 302 and 304. In this respect steps 316 and 318 are to be seen in the same way as steps 302 and 304.

For example, step 316 models how a corresponding cooling process would take place in the "cooling" aggregate on the basis of the physical data received in step 310, and then step 318 checks whether the resulting "cooled and reeled strip" product meets a corresponding quality criterion. If the quality criterion is fulfilled, the data modelled in this way can again be used in step 316 for further modelling for further subsequent processing, e.g. by pickling, whereby here again in step 318 it is checked whether the resulting product "pickled strip" corresponds to the corresponding predetermined quality criterion or not. Once the several quality criteria for the respective production units have been met, the process continues in step 320 with the actual processing of the product, in this example the cooling of the product in the desired way.

In step 328 it is checked whether the product now produced is the end product, which is of course not the case in the example of the cooled strip. In this respect, the procedure in step 310 continues with the receiving of physical data regarding the reeled and cooled product.

In the following it is assumed that the cooling unit also has an additional option for shortening the length of the cooled strip. In practice, however, this could be a separate aggregate or this process could be performed manually. Irrespective of this, a shortening of the tape must however result in a change in the physical data of the strip, namely weight and length, in a very defined and determinable manner.

In this respect, process steps 312 and 314 can now be carried out, whereby the preliminary test now analyses in retrospect to what extent, for example, based on the physical data of the hot-rolled strip (before cooling), a target length and a target weight of the cooled and shortened strip should have resulted due to the reduction in length. Step 312 thus determines a nominal value with respect to the geometric shape and/or the weight of the shortened, cooled strip. Step 314 then checks whether the physical data received in step 310 corresponds as actual values to said target values within corresponding tolerance ranges. If there is no correspondence, it must be assumed that the specified reduction was not made for whatever reason, and the signal is output in step 306. However, if step 314 shows that the plausibility check was successful, the procedure continues in step 316, in this case with the modelling of the pickling process for the cooled and shortened strip, in which the physical data of the cooled and shortened strip are used. This results in corresponding modeled physical data of a hypothetically pickled strip, whereby in step 318 a check is made as to whether these data correspond to a predetermined quality criterion or not. If they meet the quality criterion, step 316 can again be used to model how the hypothetically existing pickled strip would change with respect to annealing, etc.

However step 318 or previously step 304 do not only the question of whether or not the resulting end product ultimately corresponds to the desired end product in terms of quality. Steps 304 and 318 are also used to check whether a processing step carried out hypothetically in one of the production units can be processed further by a subsequent production unit or not. If, for example, step 304 results in a hypothetically hot-rolled strip being much too wide for further processing by one of the following aggregates, this would also be a reason to terminate the process in step 306. Optionally, it is possible to assign a positive list identifier to this product with regard to a quality criterion for which processing by downstream production units is not problem-free, and to specify that further processing of the product by downstream production units should nevertheless be permitted—if necessary under changed processing conditions, such as a reduced processing speed.

Finally, the process ends at step 330 when it has been determined in step 328 that the product resulting from the corresponding processing step is the end product.

In summary, the process enables the inspection and prediction of the conformity of produced coils with order specifications (geometry, weights) at any time during production. The customer specifies precise specifications with regard to width, thickness, outer diameter and weights as well as their tolerances. After passing through the first unit (medium strip mill, rolls), the actual data for the coil produced are available for the first time. This includes above all the weight, the average thickness, the average as well as the minimum and maximum width. However, as mentioned above, digitizing coils and coils to be rolled into strips with grid accuracy could lead to a much more accurate verification and prediction of said coil conformity.

The resulting intermediate products and the end product are tested against production and customer specifications on the basis of the actual data and by taking into account the production paths still to be completed, where geometry changes (e.g. trimming, splitting, slitting) or weight loss (plastering, sampling) are to be expected. These include the following tests: minimum slitting width undershoot, trim width overshoot or undershoot, minimum or maximum working width overshoot or undershoot, minimum or maximum outer diameter overshoot or undershoot, minimum or maximum working weight overshoot or undershoot, end product finished ring too light or too heavy for customer order, end product finished ring too narrow or too wide for customer order. The width or the weight of the rolled strip wound into a coil, which is fed to the next unit, is understood to be the working width or the working weight.

If the test fails, the corresponding intermediate product is automatically blocked for further production. The early prognosis helps to initiate measures to save the product, for example to supply at least parts of it as an end product with desired specifications and to adjust the necessary production chain accordingly. Furthermore, these checks check the plausibility of whether all specifications have been carried out. For example, this can be used to determine whether or not a given 10 m reduction was carried out.

Preferably these tests take place after each unit of the production line. These tests can be used in the context of a so-called white-list method with positive list identifiers. Certain errors (e.g. too small/large outer diameter, weight) may be allowed with respect to a single ring with upper and lower limits. In addition to the white list at ring level, there are also tests and white list methods for slabs (slab-specific positive list identification). For example, if the slab has been produced too easily for the customer order, the slab can already be permitted and this permit is inherited by the resulting rings.

LIST OF REFERENCE NUMBERS

100 Control module
102 Processor
104 Interface
106 Memory
108 End product
110 Instructions
111 Output unit
112 Physical data
114 Slab casting
116 Aggregates
117 Packaging unit
118 Slab
120 intermediate product/end product

The invention claimed is:

1. Method for controlling a rolling mill production system for production of a coil-shaped end product from a slab, the production comprising processing of the slab by sequentially arranged production units, a strip-shaped product resulting in each subsequent stage from the processing by a respective production unit of the sequentially arranged production units, the coil-shaped end product being a result of the processing of the strip-shaped product by a last production unit of the sequentially arranged production units, the method comprising:
   receiving physical data of a strip-shaped to-be-tested product, which results from processing by a given production unit of the sequentially arranged production units, the physical data comprising a geometry and/or a weight;
   a testing procedure, the testing procedure comprising:
      modeling, under consideration of the physical data, the processing of the to-be-tested product by a plurality of sequentially arranged production units subsequent to the given production unit,
      in case the modelling shows that, under consideration of the physical data, a product resulting from the processing by the plurality of sequentially arranged subsequent production units does not correspond to a first quality criterion, interrupting production of the coil-shaped end product and outputting a signal related to the interrupting; and
   a preliminary test of the physical data of the to-be-tested product, wherein the geometry described by the physical data corresponds to an actual geometry and/or the weight described by the physical data corresponds to an actual weight, wherein the to-be-tested product results from the processing by the given production unit of the sequentially arranged production units, wherein a target geometry and/or a target weight is assigned to the to-be-tested product on the basis of the processing by the given production unit, wherein in case the actual geometry deviates from the target geometry and/or the actual weight deviates from the target weight by a value, the signal is outputted.

2. Method of claim 1, wherein the modelling of the processing comprises a prediction of the physical data of the product immediately resulting from the respective processing, wherein with respect to the product immediately resulting from the respective processing, the first quality criterion comprises an admissible tolerance range with respect to a geometry and/or a weight, wherein the modelling of the respective processing takes into account the prediction of the physical data of the product immediately resulting from this respective processing.

3. Method of claim 2, wherein the tolerance range indicates the range in relation to which an immediately subsequent processing of strip-shaped products by the production unit responsible for the immediately subsequent processing is permissible at all.

4. Method of claim 2, wherein the tolerance range determines:
- a minimum and a maximum permissible width, and/or
- a minimum and a maximum permissible weight, and/or
- a minimum and a maximum coil outside diameter of the product.

5. Method of claim 2, wherein the tolerance range comprises a maximum deviation of the actual geometry resulting from the processing from a target geometry of the end product and/or a maximum deviation of the actual weight resulting from the processing from a target weight of the end product.

6. Method of claim 5, wherein the deviation of the actual geometry from the target geometry and/or the deviation of the actual weight from the target weight occurs due to:
- a pickling of the product by one of the sequentially arranged production units,
- an annealing of the product by one of the sequentially arranged production units,
- a shortening of the length of the strip-shaped product by one of the sequentially arranged production units, or
- a slitting of the coil-shaped product by one of the sequentially arranged production units.

7. Method of claim 1, where the preliminary test is performed before the testing procedure.

8. Method of claim 1, further comprising determining the target geometry and/or the target weight of the to-be-tested product, wherein the determining of the target geometry and/or the target weight comprises modelling the processing of the slab or one or more strip-shaped products by a plurality of production units preceding the given production unit to obtain the to-be-tested product.

9. Method of claim 8, wherein the modelling takes into account a reduction of the target geometry and/or the target weight due to a length reduction and/or a width reduction of one of the strip-shaped products by one of the production units preceding the given production unit.

10. Method of claim 1, further comprising, in response to the outputting of the signal, receiving a product specific positive list identifier related to the first quality criterion for which the modelling revealed that the product resulting from the processing by the subsequent production units does not meet the first quality criterion, wherein on the basis of receiving the product specific positive list identifier for the product and all products resulting from the processing of the product the first quality criterion is adjusted according to the corresponding positive list identifier.

11. Method of claim 1, further comprising receiving a slab-specific positive list identifier related to the first quality criterion, wherein on the basis of the receiving of the slab-specific positive list identifier, the first quality criterion is adjusted in accordance with the corresponding positive list identifier for all products resulting from processing of the slab.

12. Method according to claim 10, wherein the positive list identifier increases the tolerance range.

13. Method of claim 1, wherein the physical data relates to a plurality of different areas of the strip-shaped to-be-tested product according to a predefined pattern, wherein the outputted signal indicates the defect area of the strip-shaped product having physical data for which the modeling results that the product resulting from processing by the subsequent production units does not satisfy the first quality criterion.

14. Method of claim 13, further comprising checking whether a defect-free portion of the end product corresponds to another desired end product on the basis of adapted processing of the to-be-tested product by the sequentially arranged production units, the checking comprising:
- modelling, under consideration of the physical data, the adapted processing of a portion of the to-be-tested product without the defect area by the plurality of the production units subsequent to the given production unit,
- in case the modelling shows that, under consideration of the physical data, one product resulting from the adapted processing by the subsequent production units does not meet a second quality criterion, the intended manufacture of the end product is cancelled and the signal is outputted.

15. A non-transitory computer readable medium storing instructions, which when executed by a processor, configure the processor to perform the method of claim 1.

16. Method for controlling a rolling mill production system for production of a coil-shaped end product from a slab, the production comprising processing of the slab by sequentially arranged production units, a strip-shaped product resulting in each subsequent stage from the processing by a respective production unit of the sequentially arranged production units, the coil-shaped end product being a result of the processing of the strip-shaped product by a last production unit of the sequentially arranged production units, the method comprising:
- receiving physical data of a strip-shaped to-be-tested product, which results from processing by a given production unit of the sequentially arranged production units, the physical data comprising a geometry and/or a weight;
- a testing procedure, the testing procedure comprising:
  - modeling, under consideration of the physical data, the processing of the to-be-tested product by a plurality of sequentially arranged production units subsequent to the given production unit,
  - in case the modelling shows that, under consideration of the physical data, a product resulting from the processing by the plurality of sequentially arranged subsequent production units does not correspond to a first quality criterion, interrupting production of the coil-shaped end product and outputting a signal related to the interrupting, wherein
- the physical data relates to a plurality of different areas of the strip-shaped to-be-tested product according to a predefined pattern, wherein the outputted signal indicates the defect area of the strip-shaped product having physical data for which the modeling results that the product resulting from processing by the subsequent production units does not satisfy the first quality criterion, and wherein
- the method further comprises:
- checking whether a defect-free portion of the end product corresponds to another desired end product on the basis of adapted processing of the to-be-tested product by the production units, the checking comprising:
  - modelling, under consideration of the physical data, the adapted processing of a portion of the to-be-tested product without the defect area by the plurality of the production units subsequent to the given production unit,
  - in case the modelling shows that, under consideration of the physical data, one product resulting from the adapted processing by the subsequent production units does not meet a second quality criterion, the intended manufacture of the end product is cancelled and the signal is outputted.

\* \* \* \* \*